UNITED STATES PATENT OFFICE.

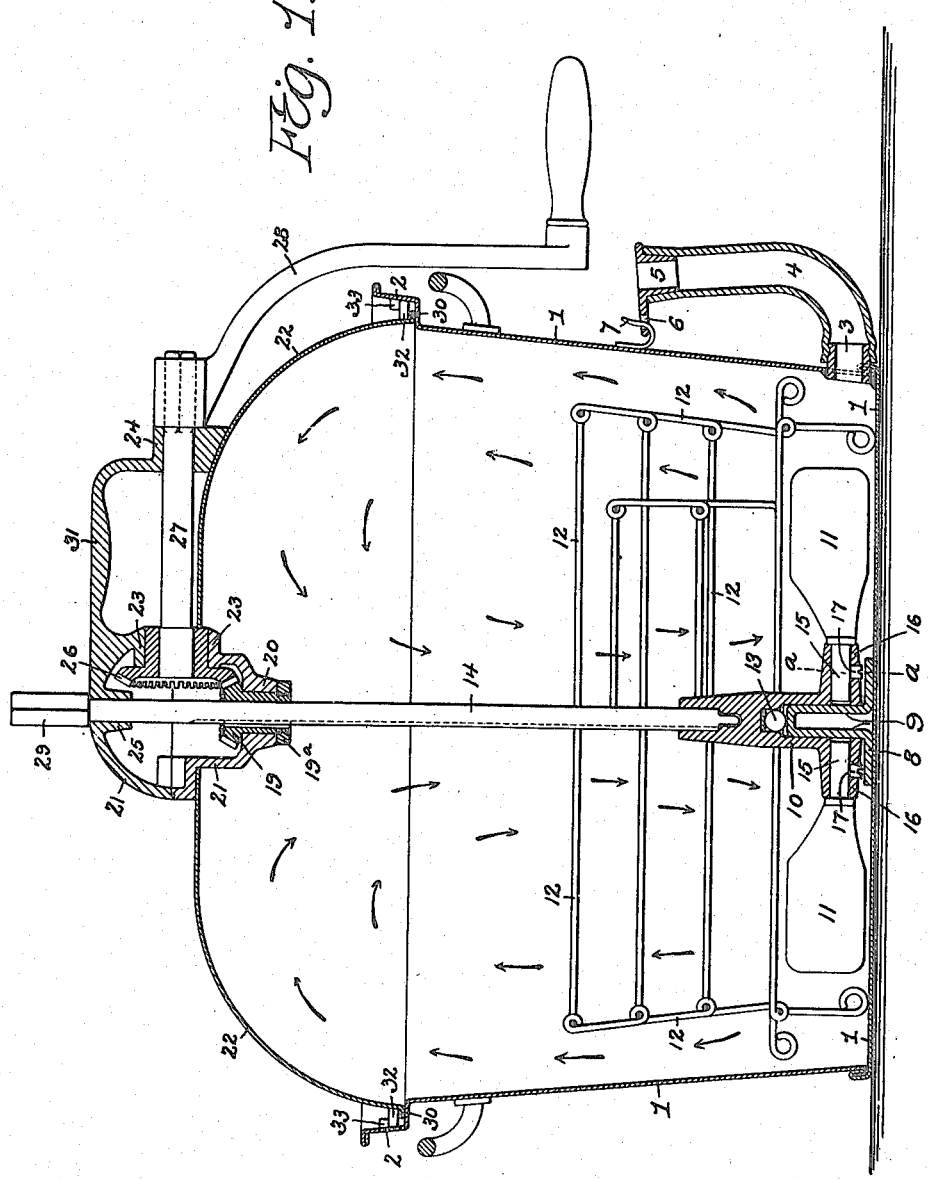

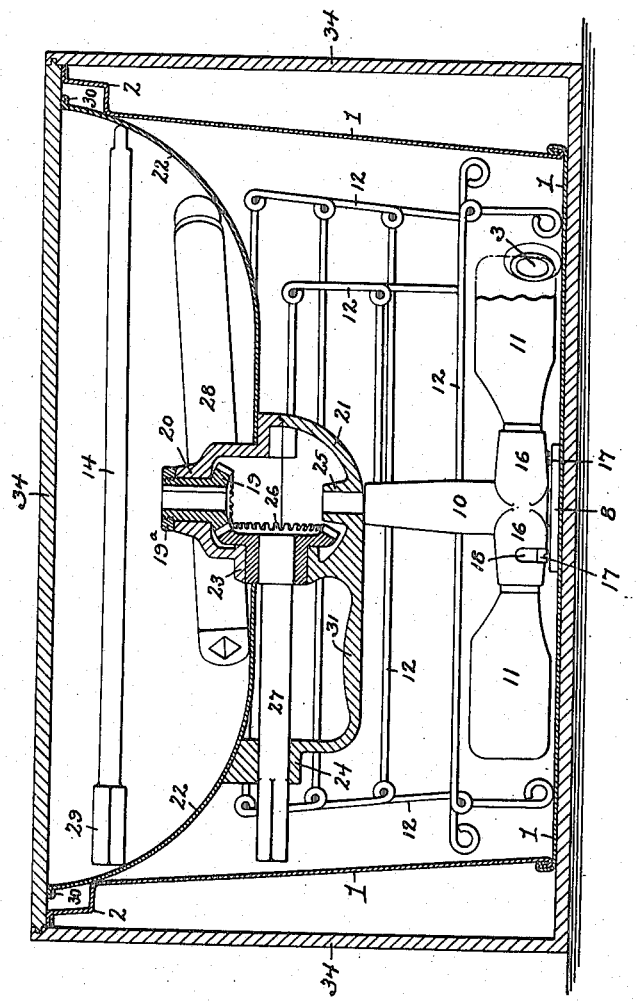

ALBERT WOOD MORRIS, OF PHILADELPHIA, PENNSYLVANIA.

DISH-WASHING MACHINE.

1,145,607. Specification of Letters Patent. Patented July 6, 1915.

Application filed May 16, 1914. Serial No. 838,899.

*To all whom it may concern:*

Be it known that I, ALBERT WOOD MORRIS, a citizen of the United States, residing in Philadelphia, Pennsylvania, have invented certain Improvements in Dish-Washing Machines, of which the following is a specification.

One object of my invention is to so construct a dish washing machine that all stuffing boxes will be eliminated, another object being to provide for upward flow of the wash water between and around the dishes by rotative movement of the operating shaft in either direction, and a further object being to provide for the compact packing of the various parts of the device for storage or transportation. These objects I attain in the manner hereinafter set forth, reference being had to the accompanying drawings, in which—

Figure 1 is a vertical transverse section of my improved dish washing pan as the same appears when in use; Fig. 2 is a similar section showing the parts as arranged for storage or transportation, and Fig. 3 is a transverse section, on enlarged scale, on the line $a$—$a$, Fig. 1.

In the drawings, 1 represents a pan similar to an ordinary dish pan, but having, at the top, an offset or expanded rim 2 and lifting handles just beneath the same, as shown in Fig. 1. Near the bottom of the pan is a discharge nipple 3 to which is attached a flexible discharge pipe 4 which can be either turned down so as to discharge liquid from the pan into a suitable receptacle or can be turned upwardly, as shown in Fig. 1, so as to prevent the escape of liquid from the pan during the washing operation, the flexible pipe having at its outer end a nozzle 5 with eye 6 for adaptation to a hook 7 on the outside of the pan so as to maintain the pipe in the upturned position shown in Fig. 1.

Secured to the bottom of the pan is the base flange 8 of an upwardly projecting stud 9 which is surrounded by and constitutes a bearing for a propeller hub 10, the latter carrying a plurality of blades 11 whereby, when the hub 10 is turned, the liquid contents of the pan are caused to flow upwardly therein and between and around the dishes deposited within a wire rack 12 in the pan, as indicated by the arrows in Fig. 1.

The hub 10 is supported upon a ball 13 which is free to rotate on the top of the stud 9 and said hub has in its upper end a socket for the reception of the lower end of a vertical shaft 14 which is flattened or of polygonal form at its lower end for adaptation to a correspondingly shaped portion of the socket whereby, when the shaft 14 is rotated in either direction, the hub 10 will be caused to rotate therewith.

Each of the propeller blades is mounted upon the hub 10 so as to be reversible thereon, and preferably so as to be self-reversing as the direction of rotation of the hub changes, so that said blades will cause an upward flow of water in the pan, irrespective of the direction of rotation of the hub. Various means of mounting the blades with this end in view may be adopted. In the present instance each of the blades 11 has a stem 15 fitted to an opening in a projecting boss 16 on the hub 10 and provided with a projecting pin or screw 17 which enters a segmental slot 18 in said boss 16, as shown in Fig. 3, whereby, when the direction of rotation of the hub 10 is reversed the blades 11 will automatically reverse their positions, owing to the fact that each of said blades presents a greater area on one side than on the other side of the axis on which it swings.

The vertical shaft 14 is grooved for the reception of a spline in the hub of a bevel pinion 19, the latter being mounted so as to be free to turn in a bearing 20 formed in a structure 21 which is secured to the dome-shaped cover 22 of the pan, the pinion 19 being vertically confined to the bearing 20 by means of a collar $19^a$ applied to the threaded lower end of the hub of the pinion, as shown in Fig. 1. The structure 21 has formed in it other bearings 23, 24 and 25, the bearing 23 receiving the hub of a bevel wheel 26 which meshes with the bevel pinion 19 and is mounted upon a horizontal shaft 27 adapted to the bearing 24 and provided at its outer end with a removable crank handle 28, whereby it may be rotated either in one direction or the other or given a back and forth movement. The bearing 25 in the structure 21 receives the upper end of the shaft 14 and said shaft is readily inserted into or withdrawn from operative engagement with the hub 10 and spur pinion 19, and said shaft 14 has its upper end squared or otherwise shaped, as shown at 29, for the reception of the handle 28, whereby said shaft 14 may, when desired, be driven directly by horizontal rotation of the handle.

The dome-shaped cover 22 has around the edge of the same a projecting flange 30 which, when the parts are in the operative position shown in Fig. 1, rests upon the flange formed by the outwardly extending rim 2 of the pan and may be maintained in contact therewith by downward pressure applied to the cover, preferably through the medium of the structure 21 which at one part is shaped so as to provide a hand hold 31 for this purpose, or the cover may, if desired, be temporarily locked to the pan by engagement of outwardly projecting lugs 32 on the cover with inwardly projecting lugs 33 on the rim of the pan.

In the operation of the pan a quantity of hot and soapy water sufficient to cover the propeller blades 11 is placed in the lower portion of the pan, the dishes are deposited edgewise in the tray 12, and the latter with its load of dishes is then placed in the pan, the cover applied thereto and the lower end of the shaft 14 caused to engage the upper end of the hub 10, the handle 28 being then rotated or rocked so as to cause the propeller blades 11 to cause an upwardly flowing current of water between and around the dishes contained in the tray, the water thus driven upwardly, descending at the center of the pan to be again projected by the action of the propeller blades when it reaches the lower portion of the pan, this operation being continued until the dishes have been properly cleaned, whereupon the dirty water can be discharged from the pan by turning down the pipe 4 and, after again restoring the latter to the upturned position, the proper amount of clean hot water can be introduced into the pan and the rotation of the handle resumed until the dishes have been properly rinsed, the rinse water being then discharged from the pan in like manner as before. After the liquid contents of the pan have been discharged, the propeller may be rotated so as to drive a current of air up between and around the dishes in the tray, in order to dry them, fresh air entering through the pipe 4, if desired.

In packing the pan for transportation or storage the shaft 14 is first withdrawn vertically from engagement with the hub 10, spur pinion 19 and bearing 25, and the handle 28 is removed from the shaft 27, whereupon the top 22 with its structure 21, shaft 27, and gear members 19 and 23 can be inverted and placed in the pan, the shaft 14 and handle 28 then placed in the inverted cover, as shown in Fig. 2, thus providing for a very compact disposal of the parts when the pan is not in use. When intended for transportation the pan and all of its appurtenant parts may be readily packed within a box or casing 34 but little if any larger than the pan itself.

I claim:

1. The combination of a dish washing pan with a rotatable water circulating device mounted therein and comprising a hub rotatable in either direction, and having a propeller blade structure mounted thereon so as to be reversible, whereby upward circulation of the liquid contents of the pan can be effected irrespective of the direction of rotation of the hub.

2. The combination of a dish washing pan with a rotatable water circulating device mounted therein and comprising a hub rotatable in either direction, and having propeller blade mechanism mounted thereon so as to be self-reversing whenever the direction of movement of the hub is reversed.

3. The combination of a dish washing pan with a water circulating device therein comprising a rotatable hub having propeller blades thereon, each pivotally mounted in the hub by means of a stem having a projecting stud which is adapted to a segmental slot in the bearing for said stem, so as to limit the extent to which the blade can turn on its pivot stem.

4. The combination of a dish washing pan having a rotatable water circulating device located in the lower portion of the same, with a transmitting shaft engaging at its lower end the hub of said circulating device, gearing for rotating said shaft, a driving shaft for said gearing, and a pan cover having bearings for said gearing and its driving shaft and also for the transmitting shaft, said transmitting shaft having a separable connection with the hub of the circulating device.

5. The combination of a dish washing pan having a rotatable water circulating device located in the lower portion of the same, with a transmitting shaft engaging at its lower end the hub of said circulating device, gearing for rotating said shaft, a driving shaft for said gearing, and a pan cover having bearings for said gearing and its driving shaft and also for the transmitting shaft, said transmitting shaft having a separable connection with the hub of the circulating device and being removable vertically therefrom and from its drive gear.

6. The combination of a dish washing pan having mounted in the lower portion of the